(12) United States Patent
Harrington

(10) Patent No.: US 6,490,008 B1
(45) Date of Patent: Dec. 3, 2002

(54) METHOD FOR REMOVING A CHECKERBOARD-LIKE NOISE ARTIFACT FROM A CAPTURED COMPOSITE NTSC VIDEO FRAME

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/373,869

(22) Filed: Aug. 13, 1999

(51) Int. Cl.[7] .................................................. H04N 5/21
(52) U.S. Cl. ..................... 348/615; 348/618; 348/620; 348/607; 382/275
(58) Field of Search ................................. 348/607, 615, 348/618, 619, 620, 606, 625; 382/275, 205; H04N 5/21, 5/213, 5/217

(56) References Cited

U.S. PATENT DOCUMENTS

| 5,841,439 A | * | 11/1998 | Pose et al. ................... 345/418 |
| 6,028,967 A | * | 2/2000 | Kim et al. ................... 382/268 |
| 6,115,503 A | * | 9/2000 | Kaup .......................... 348/607 |
| 6,233,360 B1 | * | 5/2001 | Metcalfe et al. ............ 382/252 |

* cited by examiner

Primary Examiner—John Miller
Assistant Examiner—Trang U. Tran
(74) Attorney, Agent, or Firm—Fay, Sharpe, Fagan, Minnich & McKee, LLP

(57) ABSTRACT

A method of removing a noise artifact from a video frame captured from a composite NTSC video signal is disclosed. The captured video frame is stored in a first buffer and includes a first plurality of pixels forming a first interlaced video field and a second plurality of pixels forming a second interlaced video field. For each interlaced field, a first pixel element is accessed from the first buffer, it is then determined whether the first pixel element is associated with an artifact in the video frame based on values of a first number of pixel elements including a value of the first pixel element. An adjusted value of the first pixel element is calculated based on values of a second plurality of pixel elements including the value of the first pixel element when the first pixel element is associated with an artifact in the video frame. The adjusted value of the first pixel element is stored in a second buffer when the first pixel element is associated with an artifact in the video frame to generate a filtered video frame. Otherwise, the value of the first pixel element is stored in the second buffer. Thereafter, the filtered video frame can be accessed from the second buffer and then displayed on a progressive monitor, printed on a printer, or inserted into an electronic document, etc.

19 Claims, 2 Drawing Sheets

METHOD FOR REMOVING A CHECKERBOARD-LIKE NOISE ARTIFACT FROM A CAPTURED COMPOSITE NTSC VIDEO FRAME

BACKGROUND OF THE INVENTION

The present invention relates to the video processing system art. It finds particular application in conjunction with a method and apparatus for removing a checkerboard-like noise artifact from a captured composite NTSC video frame. However, it should be appreciated that the present invention may also find application in conjunction with other types of video processing systems and applications that input composite NTSC video signals.

The NTSC video standard is used in the United States and Japan. This standard specifies a signal transmission at 525 scanning lines per video frame transmitted at a rate of 30 frames per second. Each video frame consists of two interlaced fields $F_1$ and $F_2$ that alternate at 60 times per second. The composite NTSC video signal can be represented as:

$$u(x,y,t)=Y(x,y,t)+I(x,y,t)\cos(2\pi f_s x+\Phi)\cos[\pi(f_r t-f_1 y)]+Q(x,y,t)\sin(2\pi f_s x+\Phi)\cos[\pi(f_r t-f_1 y)], \quad \text{Eq. 1}$$

where Y and (I, Q) are the luminance and the chrominance components, respectively; $f_s$ is the color subcarrier frequency; and $f_1$ an $f_r$ are the scan line and the frame frequencies, respectively.

Capturing still or freeze-frame pictures from a composite NTSC video signal for viewing on a progressive monitor, printing on a printer, inserting into an electronic document, etc. is a challenging problem in the area of video processing. Artifacts that may go unnoticed when looking at a moving video signal become extremely objectionable when viewing as a still picture.

In particular, when a composite NTSC video signal is captured, such as with a SUN Parallax video capture board, a checkerboard-like noise artifact can be observed on the vertical and diagonal edges in the captured video frame. The checkerboard-like artifact occurs in each of the interlaced fields ($F_1$, $F_2$) of the captured video frame. It is suggested that the checkerboard-like noise artifact may be a result of the quadrature demodulation and the corresponding chrominance shifts due to phase detection errors combined with the aliasing caused by the sampling of the color components during the process of A/D conversion.

Accordingly, it has been considered desirable to develop a new and improved method and apparatus for removing checkerboard-like noise artifact from a captured composite NTSC video frame that meets the above-stated needs and overcomes the foregoing difficulties and others while providing better and more advantageous results.

SUMMARY OF THE INVENTION

In accordance with one aspect of the present invention, a method of removing an artifact from a video frame captured from a moving video signal is disclosed. The video frame includes of a plurality of pixel elements stored in a buffer. The method includes the steps of a) determining whether a first pixel element is associated with an artifact in the video frame; and b) adjusting the first pixel element based on at least a second pixel element if it is determined that the first pixel element is associated with an artifact in the video frame.

In accordance with another aspect of the present invention, a method of processing a video frame captured from a moving video signal is disclosed. The video frame includes a plurality of pixel elements stored in a first buffer. The method includes the steps of a) accessing a first pixel element from the first buffer; b) determining whether the first pixel element is associated with an artifact in the video frame based on values of a first plurality of pixel elements including a value of the first pixel element; c) determining an adjusted value of the first pixel element based on values of a second plurality of pixel elements including the value of the first pixel element when the first pixel element is associated with an artifact in the video frame; d) storing the adjusted value of the first pixel element in a second buffer when the first pixel element is associated with an artifact in the video frame, otherwise storing the value of the first pixel element in the second buffer; and e) repeating steps a)–d) for a plurality of pixel elements associated with the video frame to generate a filtered video frame in the second buffer.

In yet another embodiment of the present invention a method of processing a video frame captured from a moving video signal is disclosed. The video frame includes a first plurality of pixels forming a first interlaced video field and a second plurality of pixels forming a second interlaced video field. The method includes the steps of a) determining whether a first pixel of the first field is associated with an artifact in the video frame; b) adjusting the first pixel of the first field based on at least a second pixel of the first field if it is determined that the first pixel of the first field is associated with an artifact in the video frame; c) determining whether a first pixel of the second field is associated with an artifact in the video frame; and d) adjusting the first pixel of the second field based on at least a second pixel of the second field if it is determined that the first pixel of the second field is associated with an artifact in the video frame.

One advantage of the present invention is the provision of a new method for removing a checkerboard-like noise artifact from a captured composite NTSC video frame without blurring the edges of images within the video frame.

Another advantage of the present invention is the provision of an improved method for removing a checkerboard-like noise artifact from a captured composite NTSC video frame without blurring the edges of images within the video frame.

Yet another advantage of the present invention is the provision of a new apparatus for removing a checkerboard-like noise artifact from a captured composite NTSC video frame without blurring the edges of images within the video frame.

Still another advantage of the present invention is the provision of an improved apparatus for removing a checkerboard-like noise artifact from a captured composite NTSC video frame without blurring the edges of images within the video frame.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(S)

Figure 1:
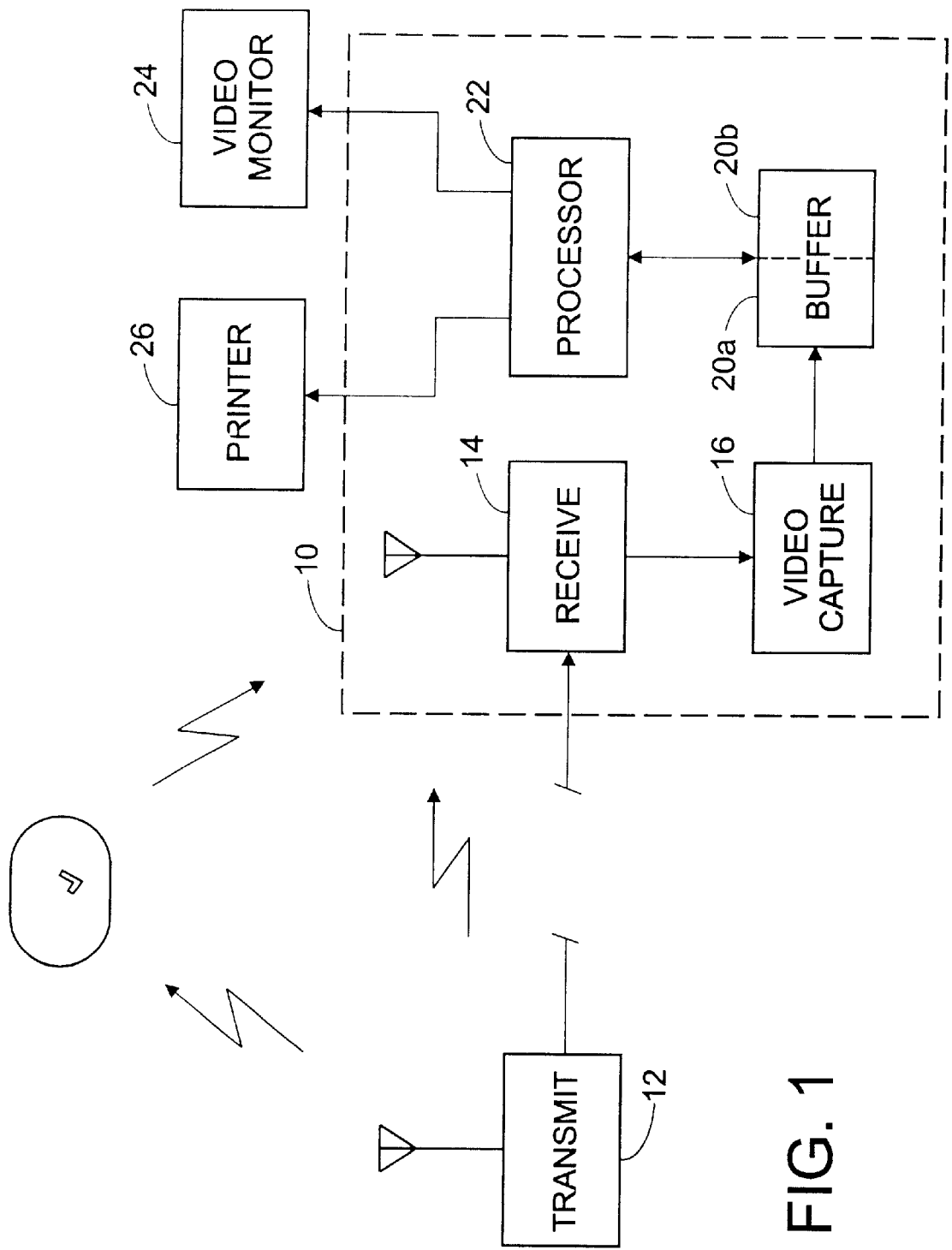
FIG. 1, is a simplified block diagram of an image processing system that incorporates the features of the present invention therein.
Figure 2:
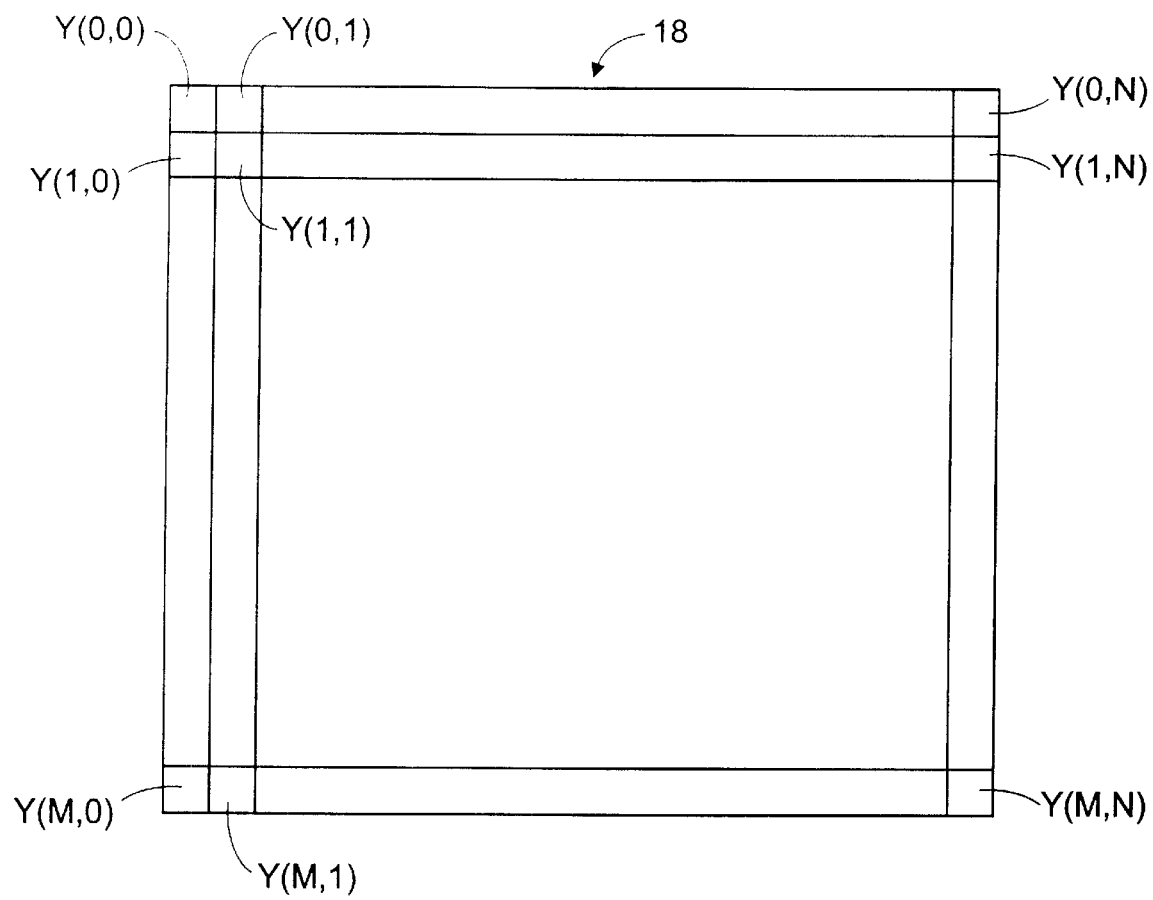
FIG. 2 is a pixelwise illustration of a captured progressive video frame having M number of scan lines divided into two interlaced fields, and N number of pixels per scan line.

FIG. 1 shows a simplified block diagram of an image processing system 10 that incorporates the features of the present invention therein. A composite NTSC video signal is broadcast from a transmitter 12 via radio waves, cable, satellite, etc. A receiver 14 demodulates the NTSC video signal. A video capture or frame grabber device 16, such as a Parallax video capture board, acquires or generates a still or freeze-frame image of the moving NTSC video signal in a conventional manner. As shown in FIG. 2, the captured video frame, comprising the interlaced fields $F_1$, and $F_2$, can be represented as an array 18 of discrete picture elements or pixels having N number of pixels per M number of raster or scan lines.

The captured video frame or array 18 is stored in a first or input buffer or other storage medium 20a. As described in detail below, a processor 22 parses the video frame on a pixel-by-pixel basis to detect and filter the checkerboard-like noise artifact. The resulting filtered video frame is then stored or written to an output buffer 20b. Thereafter, the filtered video frame can be accessed from the output buffer 20b and then displayed on a progressive monitor 24, printed on a printer 26, or inserted into an electronic document, etc.

Figures 3A, 3B:
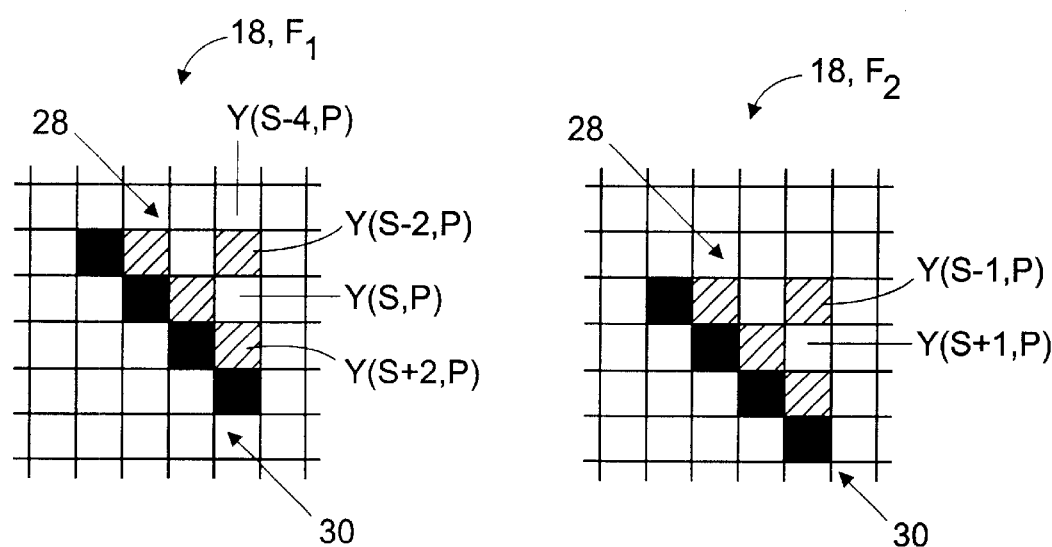
FIG. 3A illustrates a checkerboard-like noise artifact occurring in the first interlaced field $F_1$ of the video frame of FIG. 2.
FIG. 3B illustrates a checkerboard-like noise artifact occurring in the second interlaced field $F_2$ of the video frame of FIG. 2.

Referring now to FIGS. 3a and 3b, checkerboard-like noise artifacts, such as noise artifact 28, occur along the vertical and diagonal edges, such as diagonal edge 30, of an image within both fields $F_1$, $F_2$ of the video frame 18, as a result of the frame grabbing process. To facilitate describing the present invention, reference will be made only to the first interlaced field $F_1$ and the checkerboard-like noise artifact 28 occurring along the diagonal edge 30 therein. However, it should be appreciated that the noise, artifact 28 and the edge 30 can also occur in the second interlaced field $F_2$, and the present invention is equally effective in eliminating such noise artifacts occurring in either or both fields $F_1$, $F_2$. Note that the pixels associated with the noise artifact 28 are shaded only to distinguish them from the pixels associated with the edge 30.

The checkerboard-like noise artifact 28 is characterized by an alternating intensity pattern of light and dark pixels from one scan line to the next scan line along a vertical or diagonal edge within a given field $F_1$, $F_2$ of the video frame. With particular reference to FIGS. 3A and 3B, Y(S, P) is the intensity Y (i.e. the luminance component) of the Pth pixel in the Sth scan line of video frame 18, where S<=M and P<=N. The intensity of a pixel (S−4, P), located four scan lines above pixel (S, P) in the same video frame 18 (or two scan lines above pixel (S, P) in the same field $F_1$), is nearly the same as the intensity of the pixel (S, P). Likewise the intensity of pixel (S−2, P) is nearly the same as the intensity of pixel (S+2, P). However, the pixels in consecutive scan lines in the field $F_1$, such as pixels (S, P) and (S−2, P), have very different intensity values.

The checkerboard-like noise artifact is detected in the video frame 18 by searching for the alternating intensity pattern of light and dark pixels. In particular, the processor 22 can be readily programmed and/or can include the necessary circuitry for accessing the video frame 18 within the buffer 20a, and for parsing the video frame 18 (e.g. in a pixelwise column-by-column manner) to detect and filter out the checkerboard-like noise artifact according to the following pseudo-code:

If
  $|Y(S, P)-Y(S-4, P)|<TH_1$,
  and $|Y(S+2, P)-Y(S-2, P)|<TH_1$,
  and $|Y(S, P)-Y(S-2, P)|>TH_2$,
Then
  $Y_1(S, P)=((Y(S, P)+Y(S-2, P))/2$,
Else
  $Y_1(S, P)=Y(S, P)$
where:
  $TH_1$ and $TH_2$ are first and second threshold values; Y(S, P) is the intensity Y (i.e. the luminance component) of the Pth pixel in the Sth scan line of the first or second interlaced fields $F_1$ and $F_2$ of the video freeze-frame 18 that is stored in buffer 20a;
  Y(S−2, P) is the intensity Y of the Pth pixel located one scan line (S−2) above pixel (S, P) in the particular interlaced field;
  Y(S−4, P) is the intensity Y of the Pth pixel located two scan lines (S−4) above pixel (S, P) in the particular interlaced field;
  Y(S+2, P) is the intensity Y of the Pth pixel located one scan line (S+2) above pixel (S, P) in the particular interlaced field; and
  $Y_1$ is the filtered intensity value for the pixel (S, P) being processed.

The filtered intensity value $Y_1$ for the pixel (S, P) being processed is set equal to the average of the intensity values Y for the pixels (S, P) and (S−2, P) when the checkerboard-like noise artifact is detected. Otherwise, the filtered intensity value $Y_1$ for the pixel (S, P) being processed is set equal to the original unfiltered intensity value Y. In both cases the resulting intensity value $Y_1$ is written into the output buffer 20b so as to pixelwise build a filtered video frame that is then available for subsequent processing (e.g., displayed on a progressive monitor 24, printed on a printer 26, or inserted into an electronic document, etc.)

In the embodiment being described, the filtered intensity value $Y_1$ for the pixel (S, P) being processed is set equal to the average of the intensity values Y for the pixels (S, P) and (S−2, P) when the checkerboard-like noise artifact is detected. However, it is contemplated that the filtered intensity value can be set based on other pixel intensity values and based on other criteria. For example, the filtered intensity value $Y_1$ for the pixel (S, P) being processed can be set equal to the average of the intensity values Y for the pixels (S, P) and (S+2, P), or to the average of the intensity values Y for the pixels (S, P), (S−2, P), and (S+2, P), if desired.

Assuming grey scale intensity values in the range of 0 to 255, a checkerboard-like noise artifact can be satisfactorily detected by setting the first threshold $TH_1$, to a value in the range of about 16 to about 48, and by setting the second threshold $TH_2$ to a value in the range of about 7 to about 10.

Although the present invention has been described in detail above, various modifications can be implemented without departing from the spirit of the present invention. For example, the image processing system 10 of the present invention can be readily implemented on or as a general purpose computer, a personal computer, a workstation, etc.

Further, the image processing system 10 of the present invention can be readily implemented on an ASIC, thereby enabling the placement of the invention in an electronic subsystem, printer, display device, etc.

The present invention has been described with respect to a pixel intensity range of 0 to 255. However, it is contemplated by the present invention that the pixel intensity range can be any suitable range to describe the grey level of the pixel being processed. Furthermore, the present invention is readily applicable to any image processing system, not necessarily a binary output device.

Moreover, the present invention is readily applicable to a monochrome or black/white environment, and to a color environment. That is the term "grey level" has been used interchangeably to describe both black and white and color applications.

Having thus described the preferred embodiment(s), the invention is now claimed to be:

1. A method of removing an artifact from a video frame captured from a moving video signal, the video frame including a plurality of pixel elements stored in a buffer, the method comprising:
   a) determining whether a first pixel element is associated with an artifact in the video frame, including:
      determining if a first difference value between the first pixel element and a third pixel element is less than a first threshold;
      determining if a second difference value between a second pixel element and a fourth pixel element is less than the first threshold; and
      determining if a third difference value between the first difference value and the second difference value is greater than a second threshold; and
   b) adjusting the first pixel element based on at least the second pixel element if it is determined that the first pixel element is associated with an artifact in the video frame.

2. The method of claim 1, wherein:
   the first difference value, the second difference value, and the third difference value are based on grey scale values in the range of 0 to 255;
   the first threshold value is in the range of about 16 to about 48; and
   the second threshold value is in the range of about 7 to about 10.

3. The method of claim 1, wherein:
   the first pixel element is the Pth pixel in the Sth scan line of the video frame;
   the second pixel element is the Pth pixel in the S−2 scan line of the video frame;
   the third pixel element is the Pth pixel in the S−4 scan line of the video frame; and
   the fourth pixel element is the Pth pixel in the S+2 scan line of the video frame.

4. The method of claim 3, wherein step b) includes:
   setting the first pixel element equal to an average between the first pixel element and the second pixel element.

5. The method of claim 1, wherein step b) includes:
   setting the first pixel element equal to an average between the first pixel element and the second pixel element.

6. The method of claim 1, wherein the moving video signal is a Composite NTSC video signal.

7. A method of processing a video frame captured from a moving video signal, the video frame including a plurality of pixel elements stored in a first buffer, the method comprising the steps of:
   a) accessing a first pixel element from the first buffer;
   b) determining whether the first pixel element is associated with an artifact in the video frame based on values of a first plurality of pixel elements including a value of the first pixel element;
   c) determining an adjusted value of the first pixel element based on values of a second plurality of pixel elements including the value of the first pixel element when the first pixel element is associated with an artifact in the video frame;
   d) storing the adjusted value of the first pixel element in a second buffer when the first pixel element is associated with an artifact in the video frame, otherwise storing the value of the first pixel element in the second buffer; and
   e) repeating steps a)–d) for a plurality of pixel elements associated with the video frame to generate a filtered video frame in the second buffer.

8. The method of claim 7, wherein the moving video signal is a Composite NTSC video signal.

9. The method of claim 7, wherein step b) includes the steps of:
   f) determining if a first difference value between the first pixel element and a third pixel element is less than a first threshold;
   g) determining if a second differece value between the second pixel element and a fourth pixel element is less than the first threshold; and
   h) determining if a third difference value between the first difference value and the second difference value is greater than a second threshold.

10. The method of claim 9, wherein:
    the first difference value, the second difference value, and the third difference value are based on grey scale values in the range of 0 to 255;
    the first threshold value is in the range of about 16 to about 48; and
    the second threshold value is in the range of about 7 to about 10.

11. The method of claim 9, wherein:
    the first pixel element is the Pth pixel in the Sth scan line of the video frame;
    the second pixel element is the Pth pixel in the S−2 scan line of the video frame;
    the third pixel element is the Pth pixel in the S−4 scan line of the video frame; and
    the fourth pixel element is the Pth pixel in the S+2 scan line of the video frame.

12. The method of claim 11, wherein step c) includes the step of:
    i) setting the first pixel element equal to an average between at least the first pixel element and the second pixel element.

13. The method of claim 7, wherein step c) includes the step of:
    f) setting the first pixel element equal to an average between at least the first pixel element and a second pixel element.

14. A method of processing a video frame captured from a moving video signal, the video frame including a first plurality of pixels forming a first interlaced video field and a second plurality of pixels forming a second interlaced video field, the method comprising:
    a) determining whether a first pixel of the first field is associated with an artifact in the video frame, including:

determining if a first difference value between the first pixel of the first field and a third pixel of the first field is less than a first threshold, determining if a second difference value between a second pixel of the first field and a fourth pixel of the first field is less than the first threshold, and determining if a third difference value between the first difference value and the second difference value is greater than a second threshold;

b) adjusting the first pixel of the first field based on at least the second pixel of the first field if it is determined that the first pixel of the first field is associated with an artifact in the video frame;

c) determining whether a first pixel of the second field is associated with an artifact in the video frame, including:

determining if a fourth difference value between the first pixel of the second field and a third pixel of the second field is less than the first threshold, determining if a fifth difference value between a second pixel of the second field and a fourth pixel of the second field is less than the first threshold, and determining if a sixth difference value between the fourth difference value and the fifth difference value is greater than the second threshold; and d) adjusting the first pixel of the second field based on at least the second pixel of the second field if it is determined that the first pixel of the second field is associated with an artifact in the video frame.

15. The method of claim 14, wherein:

the first, second, third, fourth, fifth, and sixth difference values are based on grey scale values in the range of 0 to 255;

the first threshold value is in the range of about 16 to about 48; and the second threshold value is in the range of about 7 to about 10.

16. The method of claim 14, wherein:

the first pixel of the first field is the Pth pixel in the 5th scan line of the first field;

the second pixel of the first field is the Pth pixel in the S−1 scan line of the first field;

the third pixel of the first field is the Pth pixel in the S−3 scan line of the first field;

the fourth pixel of the first field is the Pth pixel in the S+1 scan line of the first field;

the first pixel of the second field is the Pth pixel in the Sth scan line of the second field;

the second pixel of the second field is the Pth pixel in the S−1 scan line of the second field;

the third pixel of the second field is the Pth pixel in the S−3 scan line of the second field; and the fourth pixel of the second field is the Pth pixel in the S+1 scan line of the second field.

17. The method of claim 16, wherein:

step b) includes:

setting the first pixel of the first field equal to at least an average between the first pixel of the first field and the second pixel of the first field; and step d) includes:

setting the first pixel of the second field equal to at least an average between the first pixel of the second field and the second pixel of the second field.

18. The method of claim 14, wherein:

step b) includes:

setting the first pixel of the first field equal to at least an average between the first pixel of the first field and the second pixel of the first field;, and, step d) includes:

setting the first pixel of the second field equal to at least an average between the first pixel of the second field and the second pixel of the second field.

19. The method of claim 14, wherein the moving video signal is a Composite NTSC video signal.

\* \* \* \* \*